US009444361B2

(12) United States Patent
Permuy et al.

(10) Patent No.: US 9,444,361 B2
(45) Date of Patent: Sep. 13, 2016

(54) MECHANICAL ARRANGEMENT OF A MULTILEVEL POWER CONVERTER CIRCUIT

(75) Inventors: Alfred Permuy, Rueil-Malmaison (FR); Nicholas D. Benavides, Allison Park, PA (US)

(73) Assignee: GE Power Conversion Technology, Ltd., Warwickshire (GB)

( * ) Notice: Subject to any disclaimer, the term of this patent is extended or adjusted under 35 U.S.C. 154(b) by 318 days.

(21) Appl. No.: 13/329,422

(22) Filed: Dec. 19, 2011

(65) Prior Publication Data

US 2012/0163057 A1 Jun. 28, 2012

Related U.S. Application Data

(60) Provisional application No. 61/501,876, filed on Jun. 28, 2011, provisional application No. 61/426,051, filed on Dec. 22, 2010.

(51) Int. Cl.
H02M 1/00 (2007.01)
H02M 7/00 (2006.01)
H02M 7/487 (2007.01)

(52) U.S. Cl.
CPC ............. H02M 7/003 (2013.01); H02M 7/487 (2013.01)

(58) Field of Classification Search
CPC ............................ H02M 7/003; H02M 7/487
USPC ................................ 363/17, 95, 98, 131, 132
See application file for complete search history.

(56) References Cited

U.S. PATENT DOCUMENTS

| 3,405,343 | A | 10/1968 | Boksjo |
|---|---|---|---|
| 4,203,151 | A | 5/1980 | Baker |
| 4,313,155 | A | 1/1982 | Bock et al. |
| 4,481,460 | A | 11/1984 | Kroning et al. |
| 4,689,441 | A | 8/1987 | Dick et al. |
| 4,734,315 | A | 3/1988 | Spence-Bate |
| 4,906,987 | A | 3/1990 | Venaleck et al. |
| 5,126,585 | A | 6/1992 | Boys |
| 5,131,140 | A | 7/1992 | Zimmer |
| 5,187,668 | A | 2/1993 | Okude et al. |
| 5,359,294 | A | 10/1994 | Ganger et al. |
| 5,481,448 | A | 1/1996 | Nakata et al. |
| 5,481,474 | A | 1/1996 | Lee |

(Continued)

FOREIGN PATENT DOCUMENTS

| CN | 2696197 Y | 4/2005 |
|---|---|---|
| EP | 1005132 A3 | 10/2001 |

OTHER PUBLICATIONS

United States Patent and Trademark Office, "International Search Report and Written Opinion", Jun. 20, 2012, 13 pp.

(Continued)

Primary Examiner — Jue Zhang
(74) Attorney, Agent, or Firm — Parks Wood LLC

(57) ABSTRACT

A mechanical arrangement of a multilevel power converter circuit includes a power converter having a first portion with a plurality of first control inputs, at least three direct current voltage inputs, and an alternating current voltage output, and a second portion with a plurality of second control inputs, the at least three direct current voltage inputs and the alternating current voltage output. The second portion is split apart from the first portion. The power converter has at least three levels corresponding to the at least three direct current voltage inputs.

18 Claims, 14 Drawing Sheets

(56) References Cited

U.S. PATENT DOCUMENTS

| | | |
|---|---|---|
| 5,568,035 A | 10/1996 | Kato et al. |
| 5,572,409 A | 11/1996 | Nathan et al. |
| 5,621,628 A | 4/1997 | Miyazaki et al. |
| 5,644,483 A | 7/1997 | Peng et al. |
| 5,644,500 A | 7/1997 | Miura et al. |
| 5,675,239 A | 10/1997 | Kim et al. |
| 5,684,688 A | 11/1997 | Rouaud et al. |
| 5,710,504 A | 1/1998 | Pascual et al. |
| 5,841,645 A | 11/1998 | Sato |
| 5,907,507 A | 5/1999 | Watanabe et al. |
| 5,910,892 A | 6/1999 | Lyons et al. |
| 6,005,362 A | 12/1999 | Enjeti et al. |
| 6,005,787 A | 12/1999 | Mizukoshi |
| 6,018,154 A | 1/2000 | Izaki et al. |
| 6,031,738 A | 2/2000 | Lipo et al. |
| 6,058,031 A | 5/2000 | Lyons et al. |
| 6,101,109 A | 8/2000 | Duba et al. |
| 6,225,781 B1 | 5/2001 | Okamura et al. |
| 6,288,921 B1 | 9/2001 | Uchino et al. |
| 6,314,007 B2 | 11/2001 | Johnson, Jr. et al. |
| 6,316,917 B1 | 11/2001 | Ohta |
| 6,323,623 B1 | 11/2001 | Someya et al. |
| 6,396,000 B1 | 5/2002 | Baum |
| 6,404,170 B2 | 6/2002 | Okamura et al. |
| 6,414,453 B1 | 7/2002 | Tamagawa et al. |
| 6,424,156 B1 | 7/2002 | Okamura |
| 6,430,066 B2 | 8/2002 | Emori et al. |
| 6,437,999 B1 | 8/2002 | Wittenbreder |
| 6,452,363 B1 | 9/2002 | Jabaji |
| 6,459,596 B1 | 10/2002 | Corzine |
| 6,534,949 B2 | 3/2003 | Szczesny et al. |
| 6,536,871 B1 | 3/2003 | Haddick et al. |
| 6,617,830 B2 | 9/2003 | Nozu et al. |
| 6,628,010 B2 | 9/2003 | Yamamura et al. |
| 6,741,482 B2 | 5/2004 | Yamamoto et al. |
| 6,754,090 B2 | 6/2004 | Arai et al. |
| 6,762,366 B1 | 7/2004 | Miller et al. |
| 6,777,912 B1 | 8/2004 | Yamada et al. |
| 6,777,917 B2 | 8/2004 | Desprez et al. |
| 6,791,210 B2 | 9/2004 | Stevenson et al. |
| 6,795,323 B2 | 9/2004 | Tanaka et al. |
| 6,804,353 B2 | 10/2004 | Schmokel |
| 6,806,686 B1 | 10/2004 | Thrap |
| 6,809,502 B2 | 10/2004 | Tsujii et al. |
| 6,818,838 B1 | 11/2004 | Jochym et al. |
| 6,842,354 B1 | 1/2005 | Tallam et al. |
| 6,846,992 B2 | 1/2005 | Amparan et al. |
| 6,885,170 B2 | 4/2005 | Okamura et al. |
| 6,930,899 B2 | 8/2005 | Bakran et al. |
| 6,995,994 B2 | 2/2006 | Bijlenga et al. |
| 7,040,391 B2 | 5/2006 | Leuthen et al. |
| 7,050,311 B2 | 5/2006 | Lai et al. |
| 7,126,833 B2 | 10/2006 | Peng |
| 7,206,705 B2 | 4/2007 | Hein |
| 7,216,833 B2 | 5/2007 | D'Ausilio et al. |
| 7,219,673 B2 | 5/2007 | Lemak |
| 7,259,975 B2 | 8/2007 | Holme Pedersen et al. |
| 7,271,505 B1 | 9/2007 | Miettinen |
| 7,313,008 B2 | 12/2007 | Steimer |
| 7,378,757 B2 | 5/2008 | Nakata |
| 7,379,312 B2 | 5/2008 | Baptiste et al. |
| 7,409,276 B2 | 8/2008 | Nishina et al. |
| 7,477,505 B2 | 1/2009 | Timmerman et al. |
| 7,482,816 B2 | 1/2009 | Odajima et al. |
| 7,495,418 B2 | 2/2009 | Yano et al. |
| 7,495,938 B2 | 2/2009 | Wu et al. |
| 7,525,817 B2 | 4/2009 | Yashiro |
| 7,531,987 B2 | 5/2009 | Ohasi et al. |
| 7,573,732 B2 | 8/2009 | Teichmann et al. |
| 7,583,057 B2 | 9/2009 | Morita |
| 7,586,770 B2 | 9/2009 | Toba et al. |
| 7,599,168 B2 | 10/2009 | Doljack et al. |
| 7,619,907 B2 | 11/2009 | Urakabe et al. |
| 7,622,898 B2 | 11/2009 | Shimizu et al. |
| 7,646,165 B2 | 1/2010 | Ueda et al. |
| 7,663,268 B2 | 2/2010 | Wen et al. |
| 7,671,569 B2 | 3/2010 | Kolb et al. |
| 7,741,811 B2 | 6/2010 | Daio |
| 7,751,212 B2 | 7/2010 | Perkinson |
| 7,777,456 B2 | 8/2010 | Morita et al. |
| 7,800,346 B2 | 9/2010 | Bolz et al. |
| 7,812,572 B2 | 10/2010 | Bolz et al. |
| 7,825,638 B2 | 11/2010 | Bolz et al. |
| 7,848,319 B2 | 12/2010 | Ornes et al. |
| 2002/0051370 A1 | 5/2002 | Reichard |
| 2004/0212352 A1 | 10/2004 | Anzawa et al. |
| 2004/0263121 A1 | 12/2004 | Thrap |
| 2005/0077879 A1 | 4/2005 | Near |
| 2005/0111246 A1* | 5/2005 | Lai et al. ............ 363/157 |
| 2005/0212493 A1 | 9/2005 | Yamaguchi et al. |
| 2006/0038549 A1 | 2/2006 | Mehrotra et al. |
| 2006/0152085 A1 | 7/2006 | Flett et al. |
| 2006/0221653 A1* | 10/2006 | Lai et al. ............ 363/37 |
| 2007/0001651 A1 | 1/2007 | Harvey |
| 2007/0194627 A1 | 8/2007 | Mori et al. |
| 2007/0223258 A1 | 9/2007 | Lai et al. |
| 2008/0018301 A1 | 1/2008 | Morita |
| 2008/0055947 A1 | 3/2008 | Wen et al. |
| 2008/0094042 A1 | 4/2008 | Ferrario |
| 2008/0205093 A1 | 8/2008 | Davies et al. |
| 2008/0218176 A1 | 9/2008 | Ohashi et al. |
| 2008/0252266 A1 | 10/2008 | Bolz et al. |
| 2009/0086515 A1 | 4/2009 | Sakakibara |
| 2009/0134851 A1 | 5/2009 | Takeda et al. |
| 2009/0251099 A1 | 10/2009 | Brantner et al. |
| 2009/0273321 A1 | 11/2009 | Gotzenberger et al. |
| 2010/0090663 A1 | 4/2010 | Pappas et al. |
| 2010/0148582 A1 | 6/2010 | Carter |
| 2010/0207644 A1 | 8/2010 | Nestler et al. |
| 2010/0208446 A1 | 8/2010 | Lapassat et al. |
| 2010/0283434 A1 | 11/2010 | Kakiuchi |
| 2010/0321965 A1 | 12/2010 | Sakakibara |

OTHER PUBLICATIONS

Ryszard Strzelecki, "Analysis of DC Link Capacitor Voltage Balance in Multilevel Active Power Filters", EPE 2001—Gratz, pp. 1-8.

Ashish Bendre, "Comparative Evaluation of Modulation Algorithms for Neutral-Point-Clamped Converters", IEEE Transactions on Industry Applications, Mar./Apr. 2005, pp. 634-643, vol. 41, No. 2.

A. Nami, "A New Configuration for Multilevel Converters With Diode Clamped Topology", In Proceedings 8th International Power Engineering Conference (IPEC 2007), pp. 661-665, Singapore.

H. Ertl, "Active voltage balancing of DC-link electrolytic capacitors", IET Power Electron., 2008, pp. 448-496, vol. 1, No. 4.

Unofficial English Translation of Chinese Office Action issued in connection with corresponding CN Application No. 201180068244.8 on Jun. 3, 2015.

* cited by examiner

US 9,444,361 B2

MECHANICAL ARRANGEMENT OF A MULTILEVEL POWER CONVERTER CIRCUIT

CROSS REFERENCE TO RELATED APPLICATIONS

This application claims the benefit of U.S. Provisional Patent Application Ser. No. 61/426,051, filed on Dec. 22, 2010, which is incorporated by reference herein, and U.S. Provisional Patent Application Ser. No. 61/501,876, filed on Jun. 28, 2011, which is incorporated by reference herein.

BACKGROUND

1. Field

The disclosed concept pertains generally to power electronic devices, such as multilevel power converters and, more particularly, to multilevel inverters and multilevel drives.

2. Background Information

A multilevel power inverter is a power electronic device that is structured to produce alternating current (AC) waveforms from a direct current (DC) input voltage. Multilevel power inverters are used in a wide variety of applications, such as, without limitation, variable speed motor drives and as an interface between a high voltage DC transmission line and an AC transmission line.

The general concept behind a multilevel power inverter is to use a number of power semiconductor switches coupled to a number of lower level DC voltage sources to perform power conversion by synthesizing a staircase voltage waveform. A number of different topologies for implementing a multilevel power inverter are well known, including, but not limited to, a neutral point clamped (NPC) topology, a flying capacitor (FC) topology, and an H-bridge topology. There is also a neutral point piloted (NPP) topology as disclosed herein.

As is conventional, a bank of capacitors (a "DC link") coupled to one or more DC voltage inputs is often used to provide multiple DC voltage sources employed for operation of a multilevel power inverter. For example, it is known to use such a DC link comprising a bank of capacitors in the NPC and FC topologies.

A conventional layout for a multilevel NPC power converter or a multilevel NPP power converter leads to a relatively large number of crossing electrical connections and, thus, a relatively very complicated electrical bus structure. A complicated layered buswork can be cost prohibitive in medium voltage equipment. In low voltage power converters, circuit layout complexity also adds cost.

It is known to employ relatively simpler topologies or relatively costly laminated buswork containing relatively many layers of insulators and conductors. In low voltage equipment, for example, a relatively highly complex interconnected circuit often leads to multilayer printed circuit boards (PCBs).

FIG. 1 shows a conventional electrical layout of a five-level NPC topology 2 for a single phase-leg having an AC output 4, five DC inputs 6, 8, 10, 12, 14, and a plurality of control inputs 16, 18, 20, 22 and 24, 26, 28, 30. For example, three of these topologies 2 are used to make up a three-phase DC to AC inverter (not shown). The mechanical layout (not shown) of the five-level NPC topology 2 follows from this structure of electrical connection. This structure extends to any number of levels, where a string of diodes (not shown, but see, e.g., diode strings 32, 34, 36 shown vertically with respect to FIG. 1), an extra capacitor (not shown, but see, e.g., capacitors 38, 40, 42, 44), and two extra IGBT devices (not shown, but see, e.g., IGBTs 46, 48, 50, 52 and 54, 56, 58, 60) are added for each additional level. The control and gating circuit for this phase-leg and its control inputs 16, 18, 20, 22 and 24, 26, 28, 30 is not shown.

FIG. 7 shows a conventional electrical layout of a five-level NPP topology 70 for a single phase-leg. For example, three of these single phase-legs are used to make up a three-phase DC-AC NPP inverter (not shown). NPP inverters are marketed by Converteam Inc. of Pittsburgh, Pa. The mechanical layout (not shown) of the five-level NPP topology 70 follows from this structure of electrical connection. This structure extends to any number of levels. The control and gating circuit for this phase-leg and its control inputs is not shown.

FIG. 11 shows a conventional electrical layout of a three-level NPP topology 80 for a single phase-leg where there are three DC voltage inputs 82, 84, 86.

FIG. 13 shows a conventional electrical layout of a four-level NPP topology 90 for a single phase-leg where there are four DC voltage inputs 92, 94, 96, 98.

SUMMARY

Embodiments of the disclosed concept are spatial (e.g., split) mechanical arrangements of a multilevel power converter circuit (e.g., without limitation, a diode-clamped multilevel inverter (DCMLI); a multilevel neutral point clamp (MLNPC) inverter; a three-level neutral point clamp inverter; a four-level neutral point clamp inverter (e.g., a four-level NPC); a five-level neutral point clamp inverter (e.g., a five-level NPC); a multilevel neutral point piloted (NPP) anti-parallel inverter; a multilevel neutral point piloted inverter; a three-level neutral point piloted inverter; a four-level neutral point piloted inverter; a five-level neutral point piloted inverter) to enable a relatively low cost single plane construction of each half or both halves of a single phase-leg.

In accordance with one aspect of the disclosed concept, a mechanical arrangement of a multilevel power converter circuit comprises: a power converter comprising: a first portion comprising a plurality of first control inputs, at least three direct current voltage inputs, and an alternating current voltage output; and a second portion comprising a plurality of second control inputs, the at least three direct current voltage inputs and the alternating current voltage output, the second portion being split apart from the first portion, wherein the power converter has at least three levels corresponding to the at least three direct current voltage inputs.

In accordance with another aspect of the disclosed concept, a mechanical arrangement of a multilevel power converter circuit comprises: a power converter comprising: an alternating current voltage output; a first portion comprising at least three direct current voltage inputs and an output to the alternating current voltage output providing a positive direction of current flow to the alternating current voltage output; and a second portion comprising the at least three direct current voltage inputs and an output to the alternating current voltage output providing an opposite negative direction of current flow from the alternating current voltage output, wherein the power converter has at least three levels corresponding to the at least three direct current voltage inputs.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
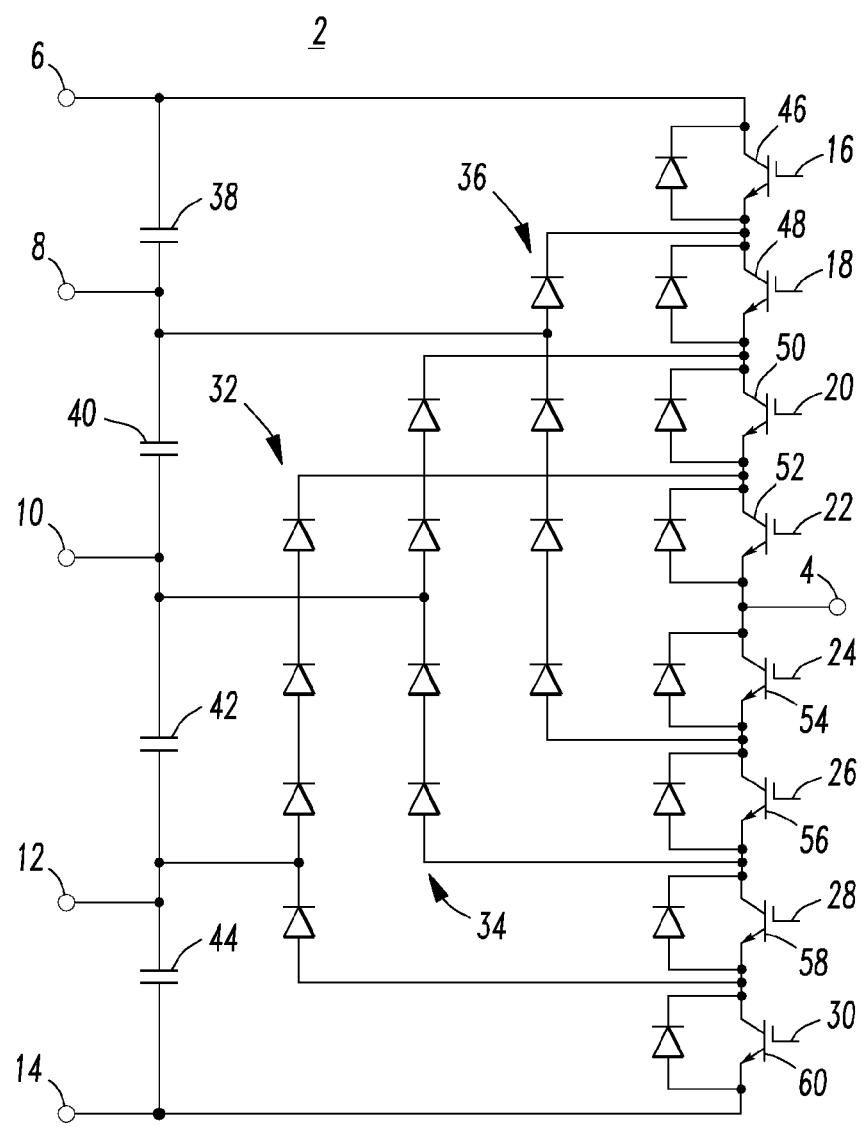
FIG. 1 is a conventional electrical layout of a five-level NPC phase-leg.

As employed herein, the term "number" shall mean one or an integer greater than one (i.e., a plurality).

As employed herein, the term "low voltage" shall mean any voltage that is less than about 600 $V_{RMS}$.

As employed herein, the term "medium voltage" shall mean any voltage greater than a low voltage and in the range from about 600 $V_{RMS}$ to about 38 $kV_{RMS}$.

As employed herein, the term "high voltage" shall mean any voltage greater than a medium voltage.

As employed herein, the term "inverter" shall mean an electrical device that converts direct current (DC) to alternating current (AC). The converted AC may be at any suitable voltage and frequency.

For example and without limitation, in a conventional two-level inverter for three AC phases, a two-level DC bus voltage is applied across a six-switch inverter bridge which produces a two-level PWM voltage output. The two levels of the DC bus constitute a positive bus and a negative bus. The six switches are divided into three branches with two switches each. A controller controls each switch via the control terminals of the switch. The top switch of each branch is connected to the positive bus and the bottom switch of each branch is tied to the negative bus.

As another non-limiting example, an inverter may optionally include an active front end where, for example, a three-phase AC to DC rectifier rectifies AC to DC for subsequent DC to AC conversion by the inverter. With an active front end, generally all of the DC input voltage points of the inverter are typically shared by multiple inverters, not just the outer two DC input voltage points, although that is a possible alternative.

In comparison to the two-level inverter, in a three-level inverter for three-phases, the DC bus has three voltage levels (relatively labeled positive, neutral and negative), and the inverter bridge has, for example and without limitation, twelve or eighteen switches.

As employed herein, the term "multilevel" (e.g., without limitation, three-level; four-level; five-level; six-level; greater than six levels) shall mean an inverter or an inverter phase-leg capable of creating three or more voltage levels at each terminal point typically with respect to a DC link voltage point somewhere in the inverter.

For example and without limitation, for a four-level inverter phase-leg, the DC voltage of a voltage intermediate circuit is subdivided into four DC potential levels. As non-limiting examples, a conventional NPC phase-leg has six IGBTs and a minimum of four diodes per phase-leg, so the minimum number of switches for a three-phase inverter is 18 or 30 depending on whether the diodes are counted. An NPP phase-leg, on the other hand, has basically a single ideal switch per level, per phase, so there is a minimum of twelve switches for a four-level NPP inverter. However, the ideal switch implementation is not believed to be realizable with current technology, so this number is generally much higher. A corresponding four-level inverter for three phases has, for example and without limitation, eighteen, thirty, thirty six or seventy two switches (e.g., without limitation, if a common voltage rating was desired for all switches, although with a variety of voltage ratings, this would drop to 36 switches for an NPC inverter and 72 switches for an NPP inverter.

Similarly, for example and without limitation, for a five-level inverter phase-leg, the DC voltage of a voltage intermediate circuit is subdivided into five DC potential levels. A corresponding inverter for three phases has, for example and without limitation, forty two or sixty switches. Again, an NPP phase-leg has basically a single ideal switch per level, per phase, so there is a minimum of fifteen switches for a five-level NPP inverter. However, the ideal switch implementation is not believed to be realizable with current technology, so this number is generally much higher.

As employed herein, the term "power converter circuit" shall mean a multilevel inverter. Non-limiting examples of multilevel inverters include a diode-clamped multilevel inverter (DCMLI); a multilevel neutral point clamp (ML-NPC) inverter; a three-level neutral point clamp inverter; a four-level neutral point clamp inverter (e.g., a four-level NPC); a five-level neutral point clamp inverter (e.g., a five-level NPC); a multilevel neutral point piloted (NPP) anti-parallel inverter; a multilevel neutral point piloted inverter; a three-level neutral point piloted inverter; a four-level neutral point piloted inverter; and a five-level neutral point piloted inverter.

DCMLI and MLNPC generally refer to the same power converter circuit. A three-level NPC, a four-level NPC and a five-level NPC, for example, are versions of an MLNPC or DCMLI.

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

There are a wide variety of ways to provide the mechanical arrangement (e.g., without limitation, physical circuit layout) in accordance with embodiments of the disclosed concept. One non-limiting example is a single-layer printed circuit board (PCB) layout for low voltage operation. This can, for example and without limitation, employ air-cooled heat sinks, employ individual liquid-cooled heat sinks, or be immersed in a liquid coolant. Although not part of the disclosed concept, there would also be an accompanying control circuit that may or may not be part of the same PCB or power converter circuit. Typically, each phase of the power converter will employ an individual PCB. For example and without limitation, the control circuit can be disposed in an enclosure proximate the front of the assembly with or without AC current sensors, or can be disposed intermediate two PCBs. Alternatively, a DC voltage measurement board can be disposed intermediate two PCBs.

As another non-limiting example, the mechanical arrangement employs dual PCBs with each half of the phase-leg being folded. The control circuit can then either be sandwiched therebetween, or can be mechanically to the side of the main power circuits. This can, for example and without limitation, employ either individual heat sinks with air or liquid cooling, or immersion cooling.

Example PCB layouts of the power converter can typically employ PCB-mount IGBTs or MOSFETs in packages such as, for example and without limitation, TO-220 or TO-247. The power converter can also be created with surface-mount devices, such as, for example and without limitation, a DPAK package that employs the PCB as a heat sink. Other possible embodiments include conventional flat-pack IGBTs on a single or multiple relatively large heat sinks.

Another example embodiment is a medium voltage air-cooled power converter made from a folded two-PCB layout with a third control circuit PCB sandwiched integrally between the other two PCBs with an insulation layer and air between each PCB.

Example applications for the disclosed concept include, for example and without limitation, medium voltage motor drives, low voltage motor drives, grid-interface converters for alternative energy, such as wind and solar converters, as well as any power converter that creates an AC voltage.

Figure 2:
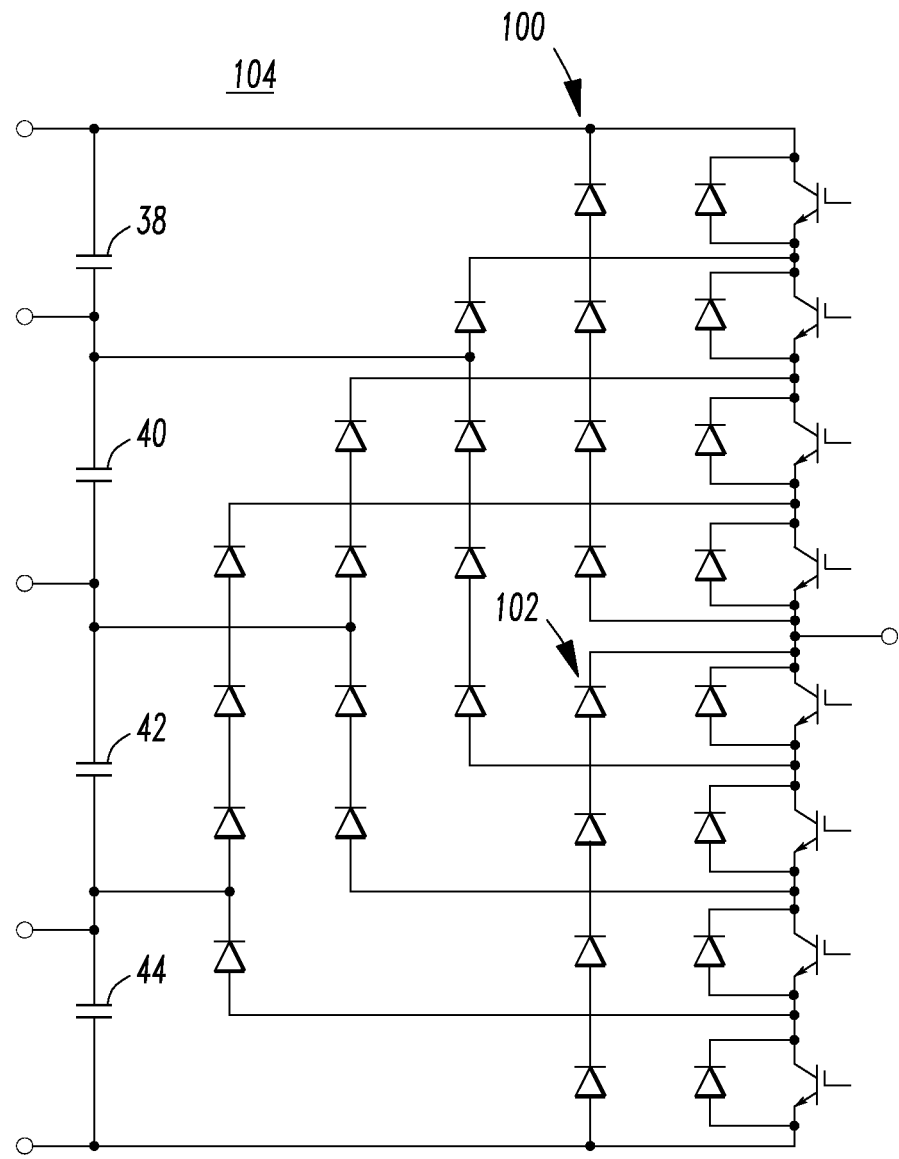
FIG. 2 is an electrical layout of a five-level NPC phase-leg with an alternate configuration for the free-wheeling-diodes (FWDs).

An alternate form of the conventional electrical layout of the five-level NPC topology 2 of FIG. 1 can be made by connecting the free-wheeling diodes (FWDs) that accompany each IGBT into single diode strings 100, 102 as shown in FIG. 2. This topology 104 is a five-level NPC phase-leg with an alternate configuration for the FWDs. In principal, the anti-parallel FWDs associated with each IGBT could then be eliminated, but they are generally needed to protect the IGBT devices in most cases. In normal operation, because the capacitors 38, 40, 42, 44 each have a positive voltage, this is functionally equivalent. There are cases where this may behave slightly differently. For example, a diode (not shown) may be placed across each capacitor 38, 40, 42, 44 to prevent the possibility of a negative charge buildup in any of the capacitors during a failure.

Example 1

Figure 3:
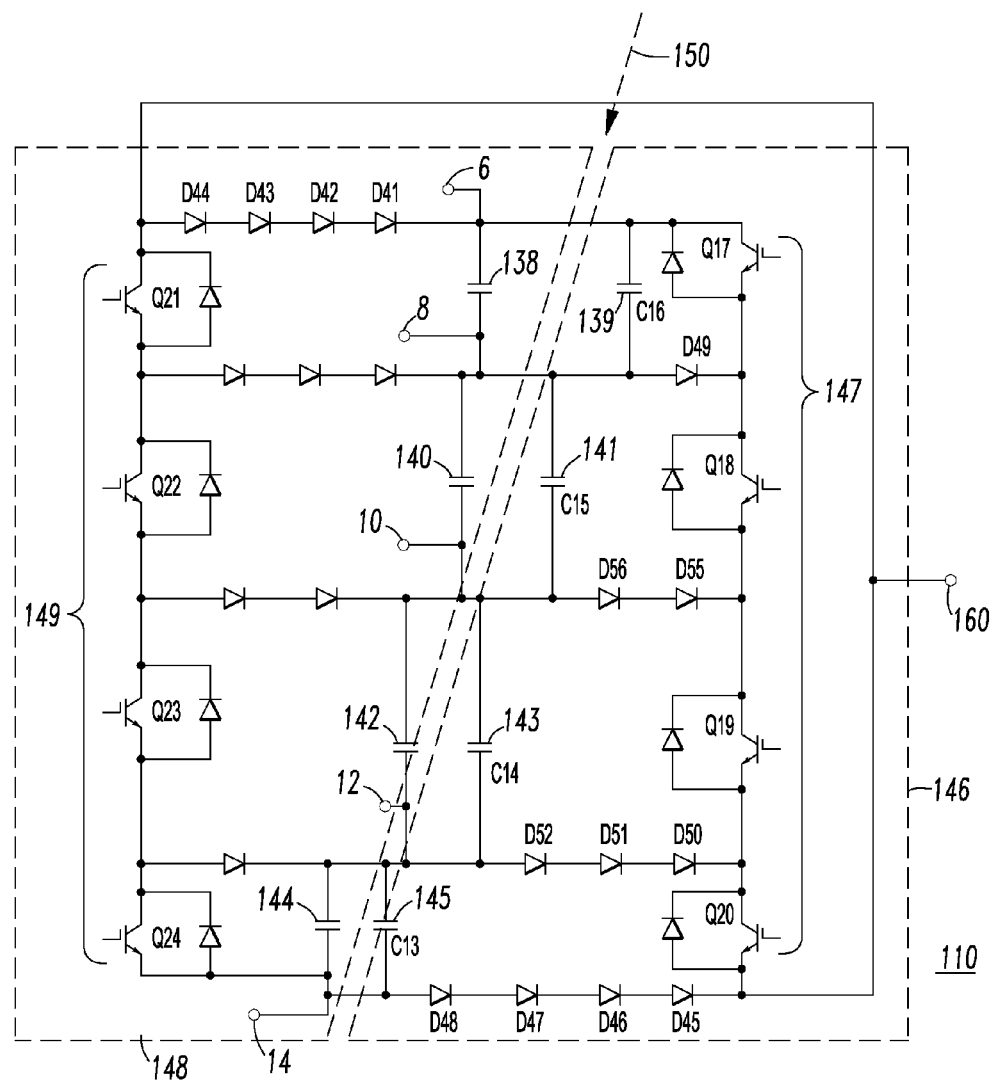
FIG. 3 is the electrical layout of the five-level NPC phase-leg of FIG. 2, but redrawn into a single plane in accordance with an embodiment of the disclosed concept.

FIG. 3 shows the same five-level NPC electronic circuit of FIG. 2, but redrawn into a single plane in accordance with an embodiment of the disclosed concept. An important aspect of the disclosed concept is this redrawn mechanical arrangement of the same power electronic circuit configuration of FIG. 1. In the disclosed mechanical arrangement 110 of FIG. 3, there are no nets that cross. The electronic circuit itself has the same electrical connections, but is believed to be mechanically novel and non-obvious. The capacitors 38, 40, 42, 44 of FIG. 2 are split into two parallel capacitors 138-139, 140-141, 142-143, 144-145, but this is only shown to show later how it could optionally be split into two separate circuits, such as example PCBs for the half-legs 146, 148.

Example 2

In the disclosed mechanical arrangement 110 of FIG. 3, the first half-leg 146 can be on a first layer of a PCB, and the second half-leg 148 can be on a different second layer of the same PCB separated from the first layer by an insulator (e.g., without limitation, the fiberglass of the PCB).

Example 3

In the disclosed mechanical arrangement 110 of FIG. 3, the first half-leg 146 can be on a first area of a PCB, and the second half-leg 148 can be on a different second area of the same PCB separated from the first area by a gap (e.g., shown about the axis 150 of FIG. 3) between the first area and the second different area. For example, the first area of the PCB includes at least one layer (e.g., one layer; two layers), and the different second area of the PCB includes at least one layer (e.g., one layer; two layers).

Example 4

Figure 4:
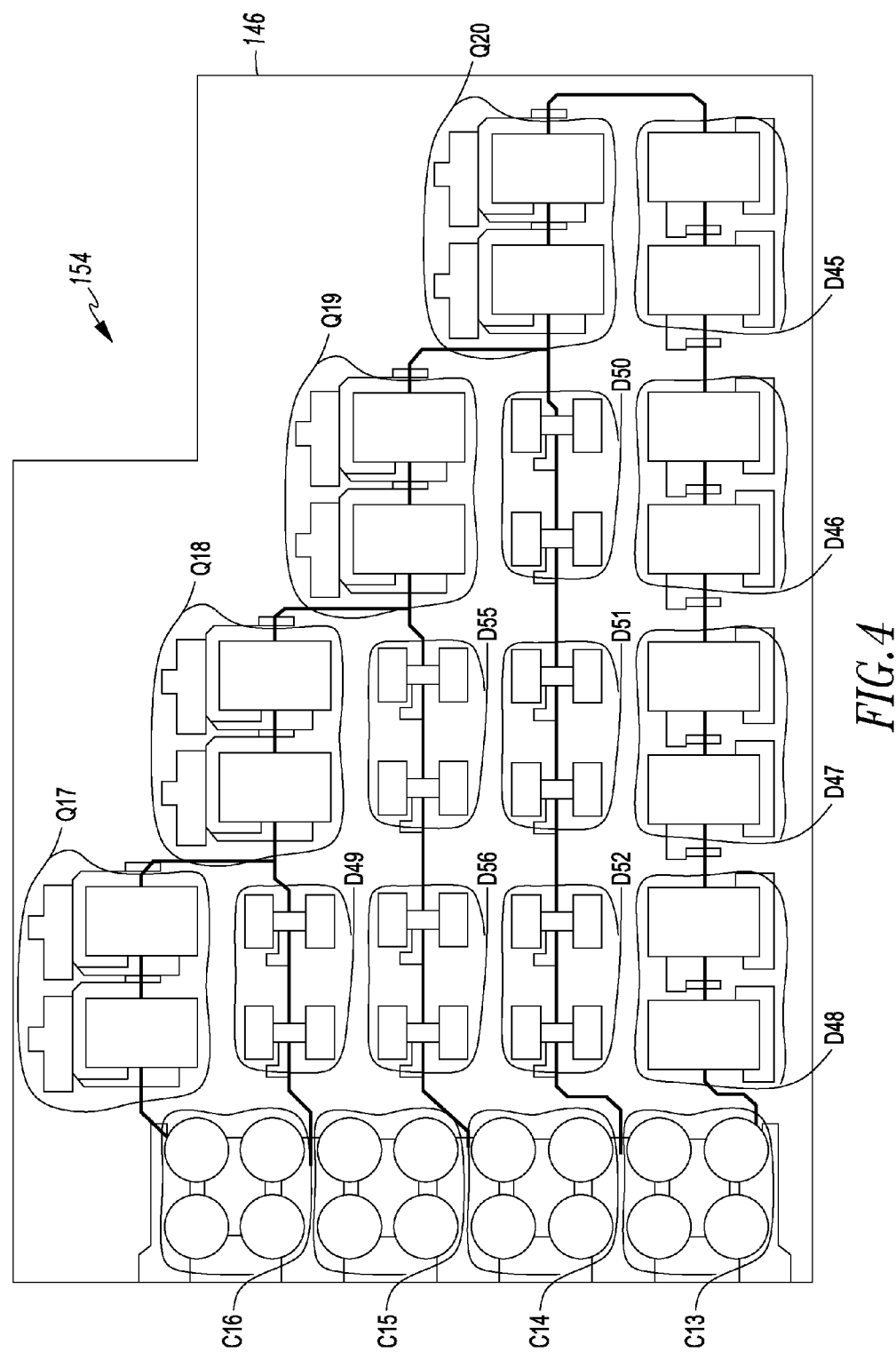
FIG. 4 is a plan view of an upper power board for the five-level NPC phase-leg of FIG. 3.
Figure 5:
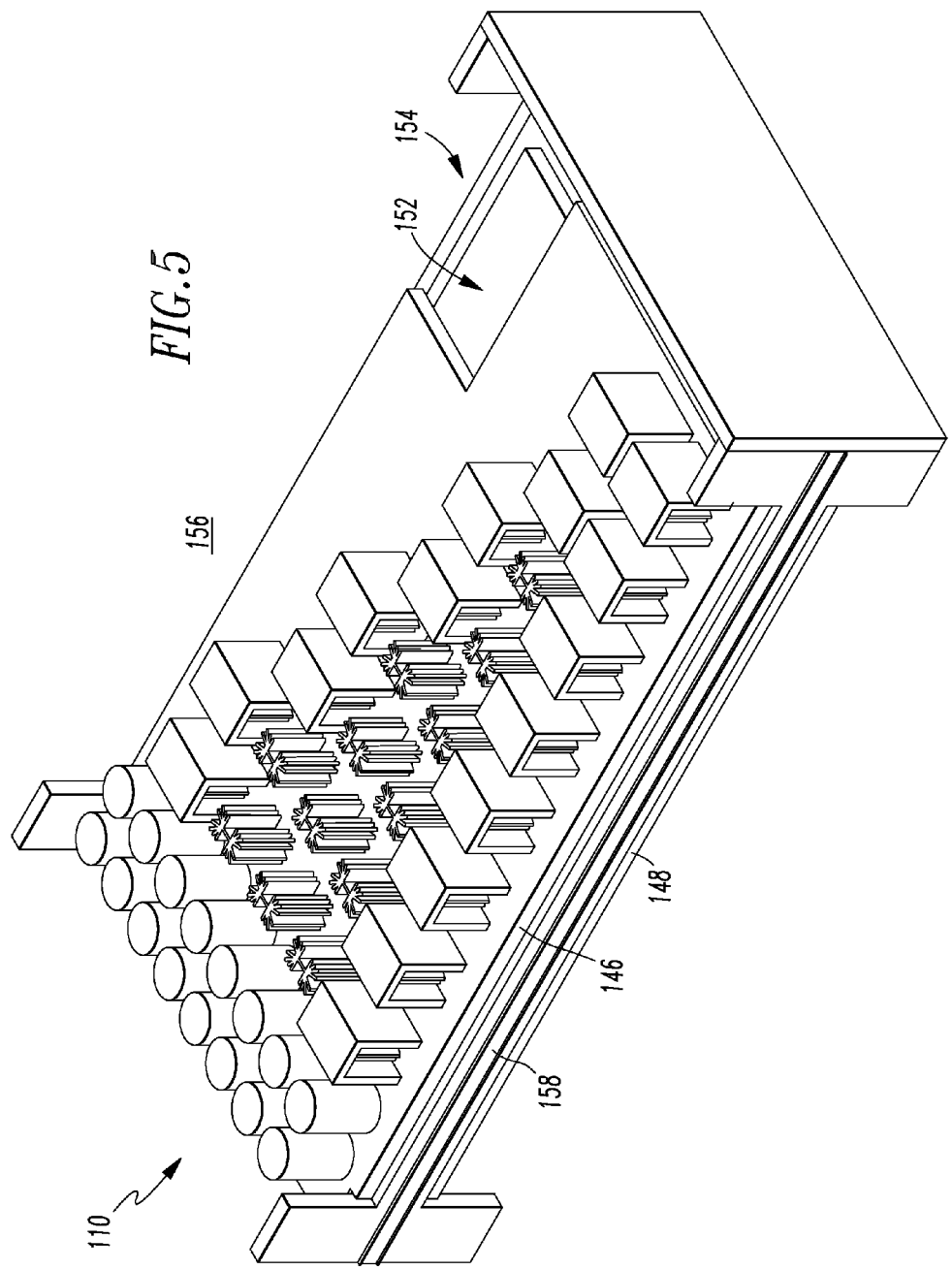
FIG. 5 is an isometric view of an assembled phase-leg primarily showing the upper power board of FIG. 4 in which the corner of a control board is shown through a cutout in the upper power board.
Figure 6:
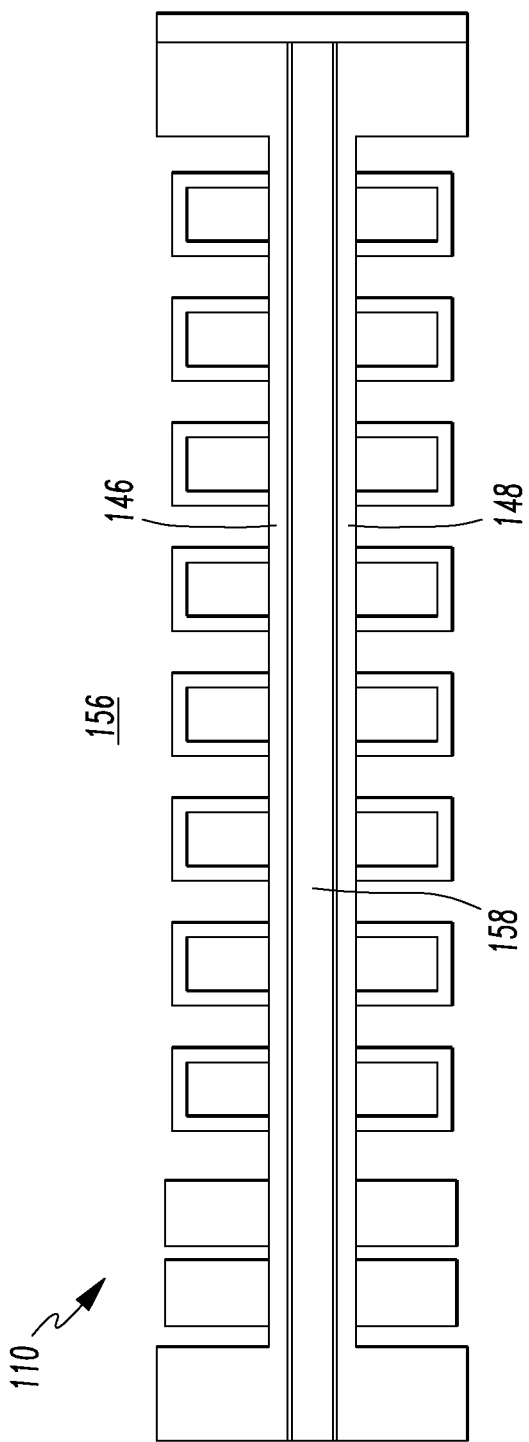
FIG. 6 is vertical elevation view of an assembled module showing the upper power board of FIG. 5 and a lower power board.

Also referring to FIGS. 4-6, a non-limiting example of the new mechanical arrangement 110 is shown. Here, the five-level NPC electrical circuit topology 104 of FIG. 2 is first redrawn into a single plane (as shown in FIG. 3) and, then, is split into the two half-legs 146, 148. This mechanical arrangement 110 enables, for example and without limitation, a compact PCB or a relatively very simple single plane buswork (see, e.g., FIGS. 15A-15C for a three-level NPP) to be employed. Another benefit of this mechanical arrangement 110 is that all adjacent devices have the same voltage drop, such that there is an even voltage gradient across the example PCB or buswork at all times. This enables medium voltage circuitry on, for example and without limitation, a two-layer PCB.

Additionally, as shown in FIG. 3, the single plane version of the mechanical arrangement 110 can be divided down the capacitor axis 150 such that first (e.g., without limitation, upper with respect to FIGS. 5 and 6) and second (e.g., without limitation, lower with respect to FIGS. 5 and 6) power sections are created. These two power sections then can be sandwiched (as best shown in FIG. 6) into a structure that enables a relatively more compact overall design. The control circuitry 152 (FIG. 5) can either be placed in between these layers, as shown, or integrated into one or both of the power PCBs or on the front of a module (not shown).

As shown in FIG. 4, a circuit for the example half-leg 146 can be constructed using the five-level NPC mechanical arrangement 110 of FIG. 3, but with multiple series and parallel combinations of each component in order to provide desired voltage and current ratings. For example and without limitation, each IGBT, such as Q17, Q18, Q19, Q20, shown is eight devices (e.g., two series sets of four parallel devices). The FWDs, such as D48, D47, D46, D45, can also be made of up to eight devices (e.g., two series sets of four parallel devices). The other diodes, such as D49, D56, D55, D52, D51, D50, are made of two devices (e.g., two series devices). The capacitors, such as C16, C15, C14, C13, are each made of four capacitors (e.g., two series sets of two parallel devices). It will be appreciated that the power semiconductor devices, diodes and capacitors can be made of any suitable number and arrangement of such devices in a wide range of simpler, different or more complex combinations.

FIG. 4 shows the first half-leg 146 (e.g., without limitation, upper power section) of FIG. 3. The second half-leg 148 (e.g., without limitation, lower power section) of FIG. 3 (not shown in FIG. 4) is similar except for the example cutout 154 in the upper right (with respect to FIG. 4) corner. This cutout 154 is for access to portions of the control circuitry 152 (FIG. 5), and is not critical to the disclosed concept. For convenience of reference, the IGBT, resistor and capacitor reference designators are shown in both of FIGS. 3 and 4.

FIGS. 5 and 6 show a partially assembled module 156 including the first and second half-legs 146, 148, which form a phase-leg. The module 156 includes a suitable insulator 158 (e.g., without limitation, a number of sheets of plastic) with cutouts and holes (not shown) used between the half-legs 146, 148 for extra voltage isolation.

In the example of FIGS. 4-6, the first portion or first half-leg 146 is on a first PCB, and the second portion or second half-leg 148 is on a second PCB separated from the first PCB by the example insulator 158. Also, in this example, the first PCB is parallel to and above (with respect to FIGS. 5 and 6) the second PCB. The first and second PCBs each include a plurality of layers (e.g., without limitation, two layers, such as a component side layer and a circuit side layer).

Example 5

Referring again to FIG. 3, the alternating current voltage output 160 is an alternating current connection point for the phase-leg formed by the half-legs 146, 148. The alternating current voltage output 160 provides, for example and without limitation, a staircase alternating current voltage waveform and/or a non-sinusoidal alternating current waveform. The staircase alternating current voltage waveform may approximate a sinusoidal alternating current waveform with progressively larger numbers of levels or any other suitable alternating current waveform. For one alternating current cycle, the half-leg 146 conducts the positive direction of current flow, for example, through FWDs D48, D47, D46, D45, through the transistors Q17, Q18, Q19, Q20 or through various other paths depending upon which level it is employing, to the alternating current voltage output 160 for a first half of the alternating current cycle, thereby providing a positive direction of current flow to the output 160. The other half-leg 148 conducts the negative direction of current flow from the alternating current voltage output 160, for example, through the FWDs D44, D43, D42, D41, through the transistors Q21, Q22, Q23, Q24 or through various other paths depending upon which level it is employing, for the opposite second half of the alternating current cycle, thereby providing an opposite negative direction of current flow from the output 160.

The first half-leg 146 includes a first number (e.g., without limitation, four in this example, although 16 individual capacitors to form C16, C15, C14, C13 are shown in FIG. 4) of direct current link capacitors 139, 141, 143, 145. The second half-leg 148 similarly includes a second number (e.g., without limitation, four in this example, although 16 are shown in FIG. 4 for the first half-leg 146) of direct current link capacitors 138, 140, 142, 144. The capacitors 139, 141, 143, 145 are electrically connected in parallel with the respective capacitors 138, 140, 142, 144, thereby permitting the power converter to be constructed by being folded across the axis 150 of these DC link capacitors.

If the mechanical arrangement 110 of FIG. 3 is employed with an optional active front end (e.g., without limitation, an AC to DC rectifier), then this power converter is a phase leg of a rectifier.

Figure 7:
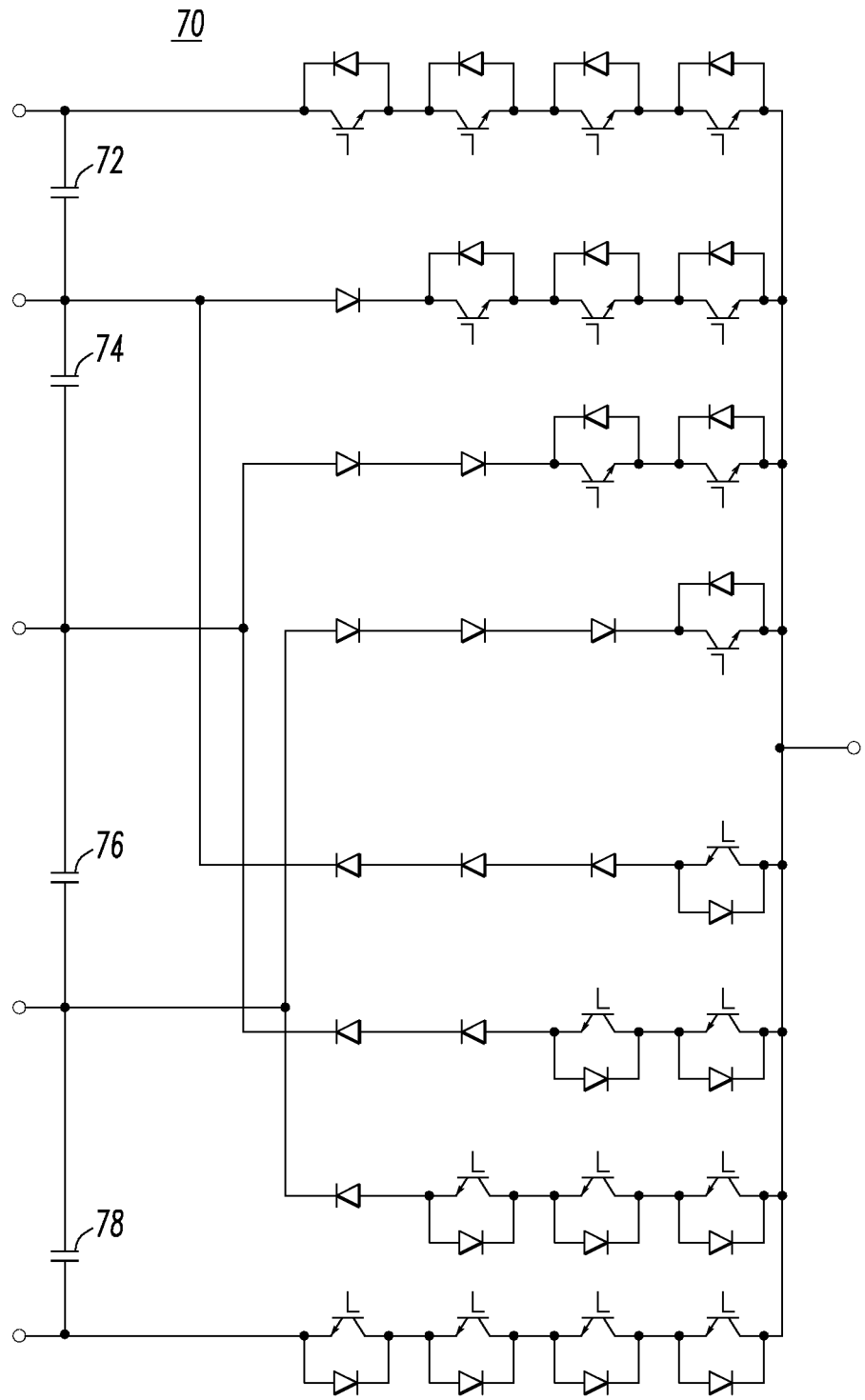
FIG. 7 is a conventional electrical layout of a five-level NPP phase-leg.
Figure 8:
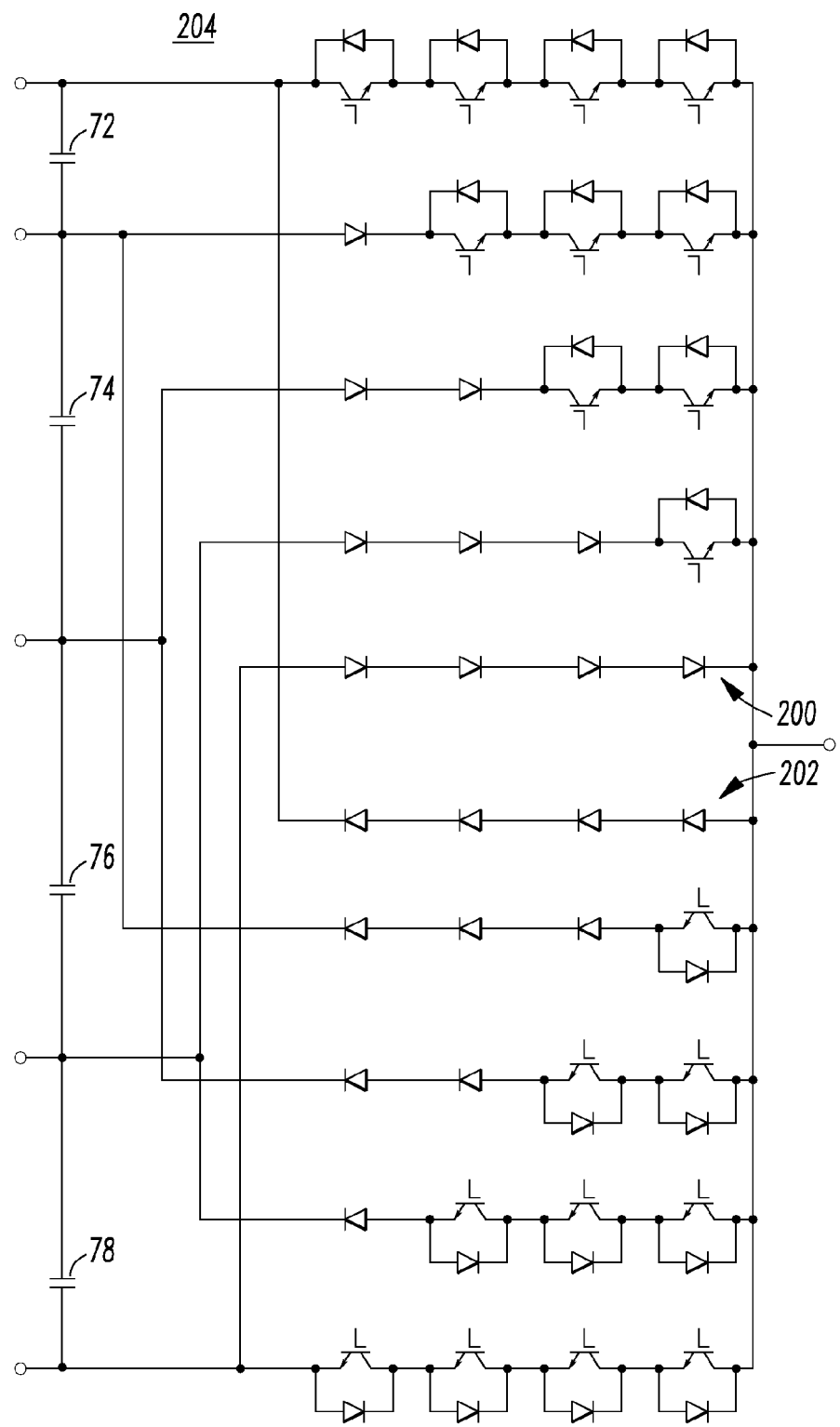
FIG. 8 is an electrical layout of a five-level NPP phase-leg with an alternate configuration for the FWDs.

Referring to FIG. 8, an alternate form of the conventional electrical layout of a five-level NPP topology 70 of FIG. 7 can be made by connecting extra sets of FWDs that accompany each IGBT into the single diode strings 200, 202 as shown in FIG. 8. This topology 204 is a five-level NPP phase-leg with the alternate configuration for the FWDs. In normal operation, because the capacitors 72, 74, 76, 78 each have positive voltage, this is functionally equivalent. In principal, the anti-parallel FWDs associated with each IGBT could then be eliminated, but they are generally needed to protect the IGBT devices in most cases.

Example 6

An important aspect of the disclosed concept is a redrawn mechanical arrangement 210 (FIG. 9) of the same power circuit configuration of FIG. 8. In the disclosed mechanical arrangement 210 of FIG. 9, there are no nets that cross. The electronic circuit itself of FIG. 9 has the same electrical connections as the topology 204 of FIG. 8, but is believed to be mechanically novel and non-obvious. The capacitors 72, 74, 76, 78 of FIG. 8 are split into two parallel capacitors 272-273, 274-275, 276-277, 278-279, respectively, but this is only shown to show later how it could optionally be split into two separate circuit (e.g., without limitation, PCBs).

Figure 9:
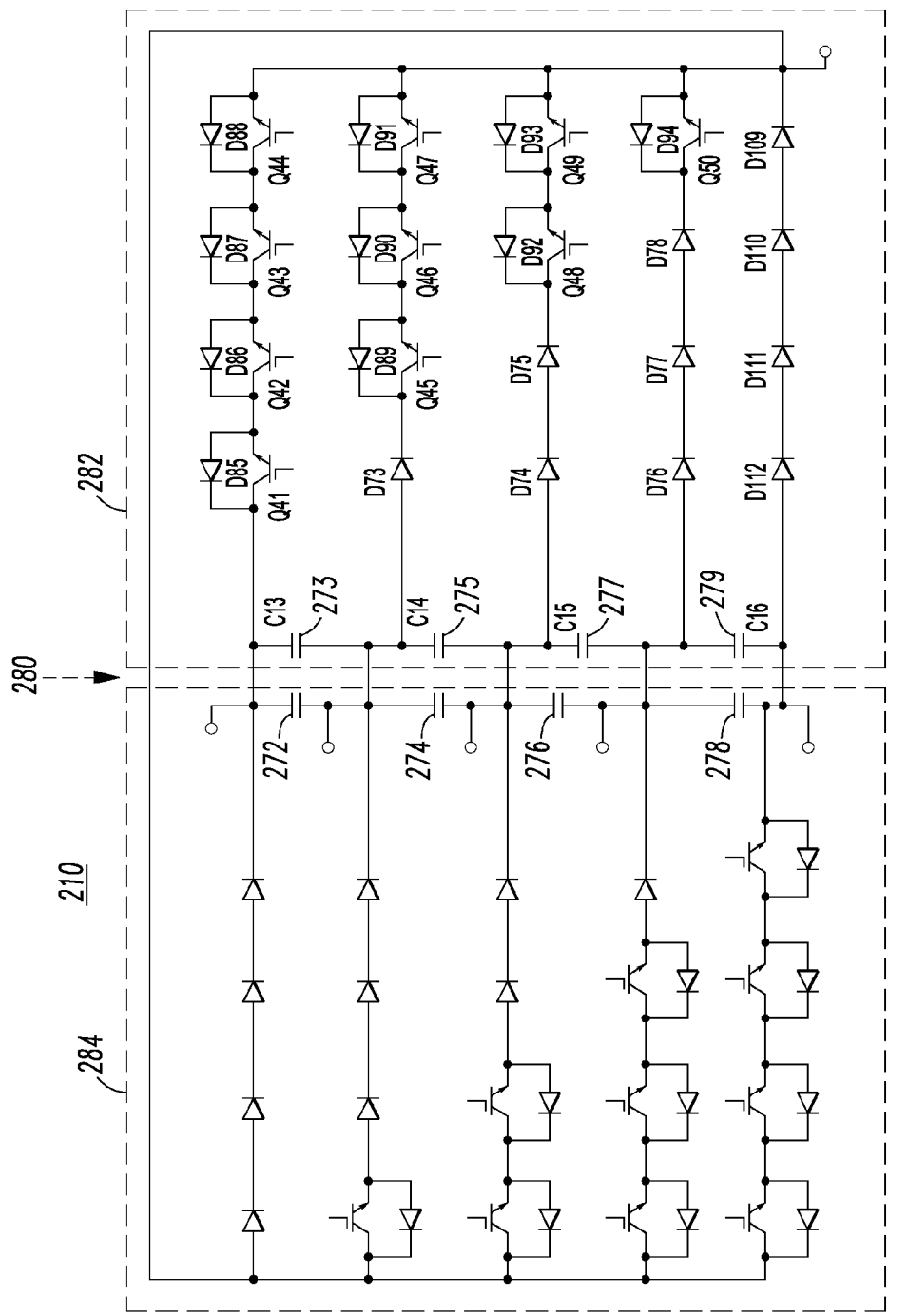
FIG. 9 is the electrical layout of the five-level NPP phase-leg of FIG. 8, but redrawn into a single plane in accordance with an embodiment of the disclosed concept.

FIG. 9 shows the same five-level NPP electronic circuit of FIG. 8, but redrawn into a single plane in accordance with an embodiment of the disclosed concept. The disclosed mechanical arrangement 210 of FIG. 9 enables a relatively compact PCB or relatively very simple single plane buswork to be employed. Another benefit of this layout is that all adjacent devices have the same voltage drop, such that there is an even voltage gradient across the circuit (e.g., without limitation, PCB; buswork) at all times. This enables medium voltage circuitry on, for example and without limitation, a two-layer PCB.

Additionally, the single plane version of the layout can be divided down the capacitor axis 280 such that first 282 (e.g., without limitation, upper layer) and second 284 (e.g., without limitation, lower layer) power sections (e.g., without limitation, PCB; buswork) are created. These two power sections 282, 284 then can be sandwiched into a structure (not shown, but see the sandwich structure of FIGS. 5 and 6) that enables a relatively more compact overall design. The control circuitry (not shown, but see the control circuitry 152 of FIG. 5) can be placed in between these two power sections, integrated into one or both of such power sections, or adjacent the two power sections.

A circuit assembly for the example first power section (half-leg) 282 can be constructed using the five-level NPP mechanical arrangement 210 of FIG. 9, but with multiple series and parallel combinations of each component in order to provide desired voltage and current ratings. For example and without limitation, each IGBT, such as Q41, Q42, Q43, Q44, Q45, Q46, Q47, Q48, Q49, Q50 shown is eight devices (e.g., two series sets of four parallel devices), and each FWD, such as D112, D111, D110, D109, D76, D77, D78, D74, D75, can also be made of eight devices (e.g., two series sets of four parallel devices). The other diodes, such as D85, D86, D87, D88, D89, D90, D91, D92, D93, D94, are made of two devices (e.g., two series devices). Also, diodes, such as D85, D86, D87 and D88, are not always present. Further, in the example embodiment, diode D73 and IGBT/diode Q50/D94 are three series sets of four parallel devices. It will be appreciated that the power semiconductor devices, diodes and capacitors can be made of any suitable number and arrangement of such devices in a wide range of simpler, different or more complex combinations.

A circuit assembly for the example second power section (half-leg) 284 of FIG. 9 is not shown for brevity, but is nearly identical except for the switch direction difference shown in FIG. 9.

Figure 10:
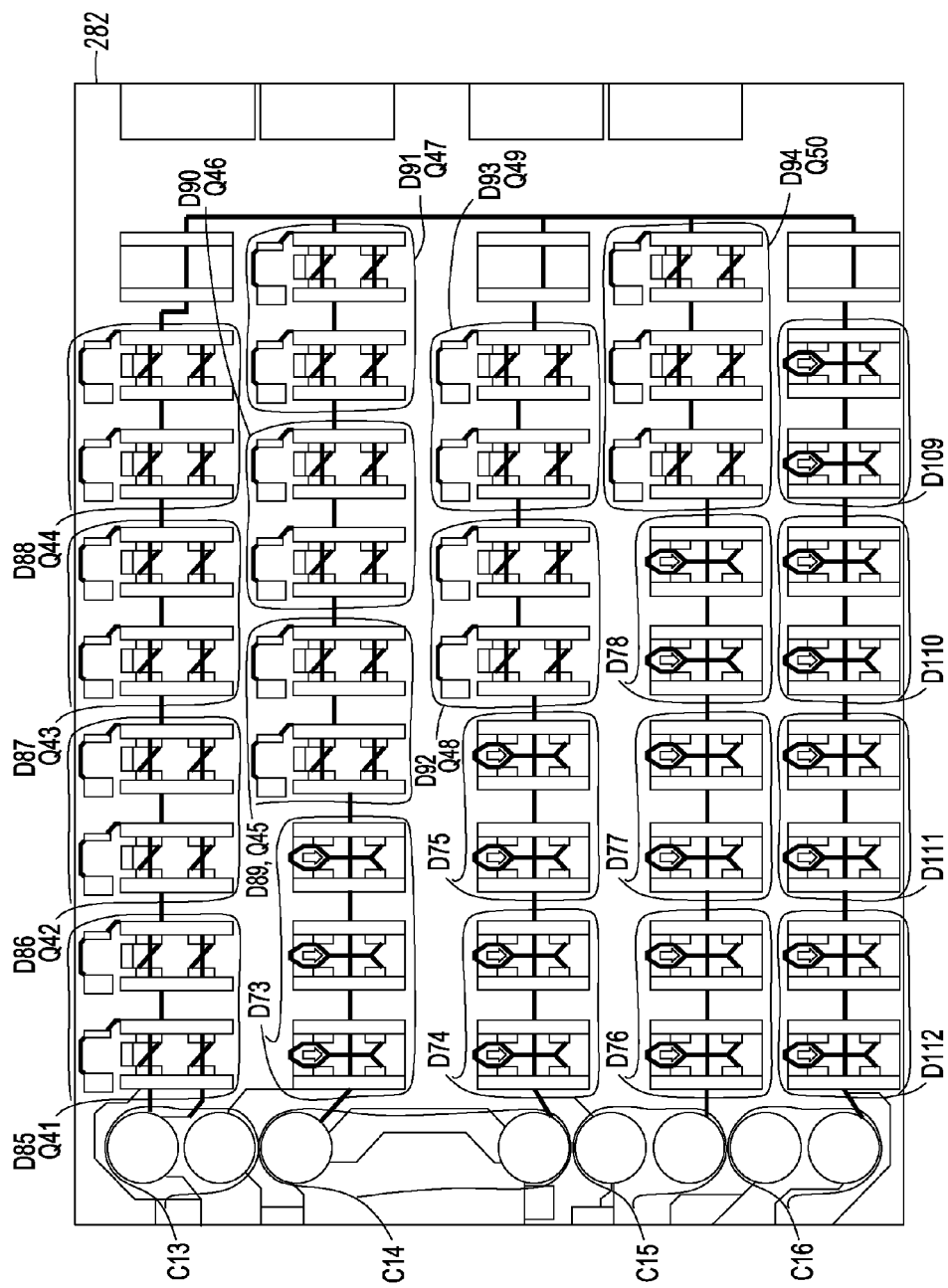
FIG. 10 is a plan view of an upper power board for the five-level NPP phase-leg of FIG. 9.

The example circuit assemblies shown in FIGS. 4 and 10 employ two PCB layers (e.g., without limitation, component side and circuit side). The disclosed concept eliminates the need for more than two PCB layers.

Example 7

Figure 11:
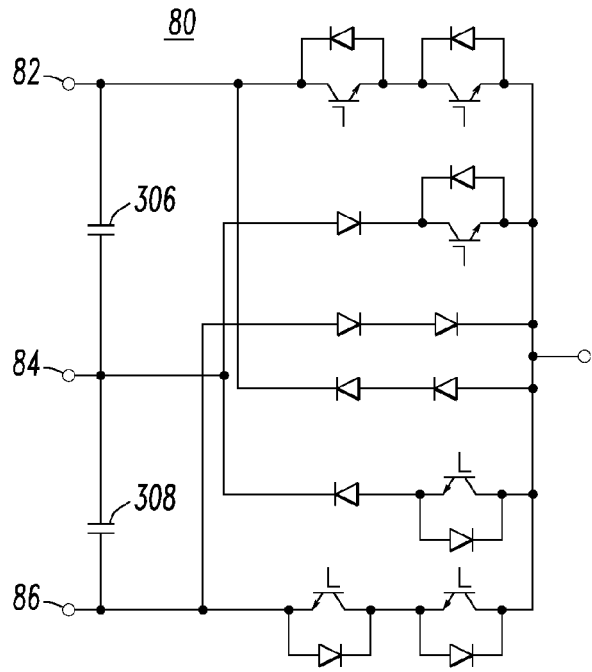
FIG. 11 is a conventional electrical layout of a three-level NPP phase-leg.
Figure 12:
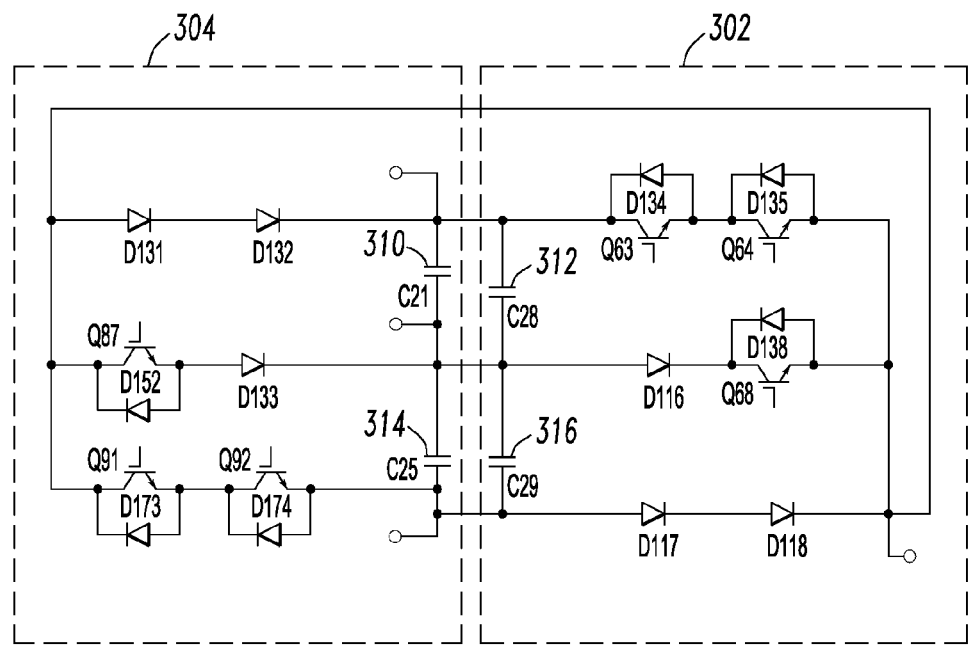
FIG. 12 is the electrical layout of the three-level NPP phase-leg of FIG. 11, but redrawn into a single plane after being split into half-legs in accordance with an embodiment of the disclosed concept.

FIG. 12 shows a redrawn mechanical arrangement 300 of the same three-level NPP topology 80 of FIG. 11. This is redrawn into a single plane after being split into half-legs 302, 304 in accordance with an embodiment of the disclosed concept. An important aspect of this mechanical arrangement 300 is that there are no nets that cross. The electronic circuit itself of FIG. 12 has the same electrical connections as the topology 80 of FIG. 11, but is believed to be mechanically novel and non-obvious. The capacitors 306, 308 of FIG. 11 are split into two parallel capacitors 310-312, 314-316, respectively, of FIG. 12.

Example 8

Figure 13:
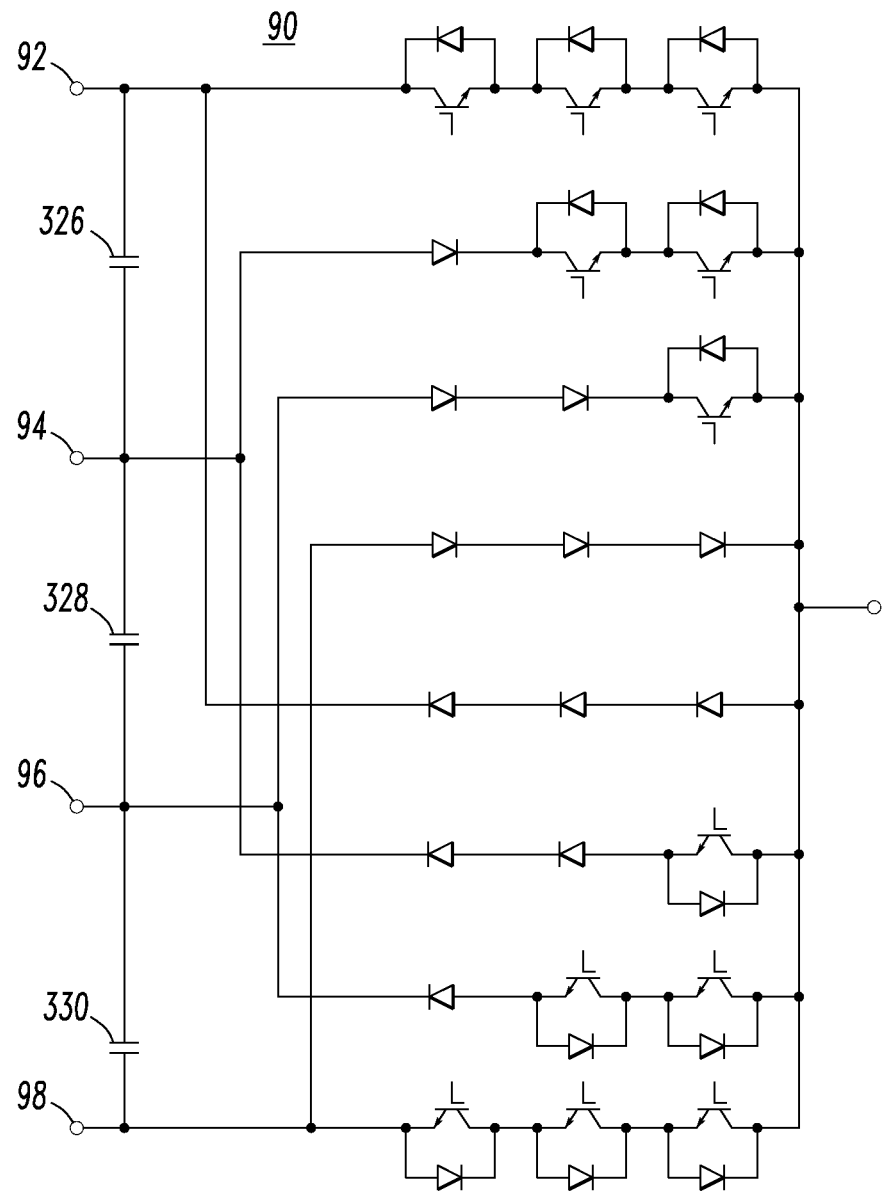
FIG. 13 is a conventional electrical layout of a four-level NPP phase-leg.
Figure 14:
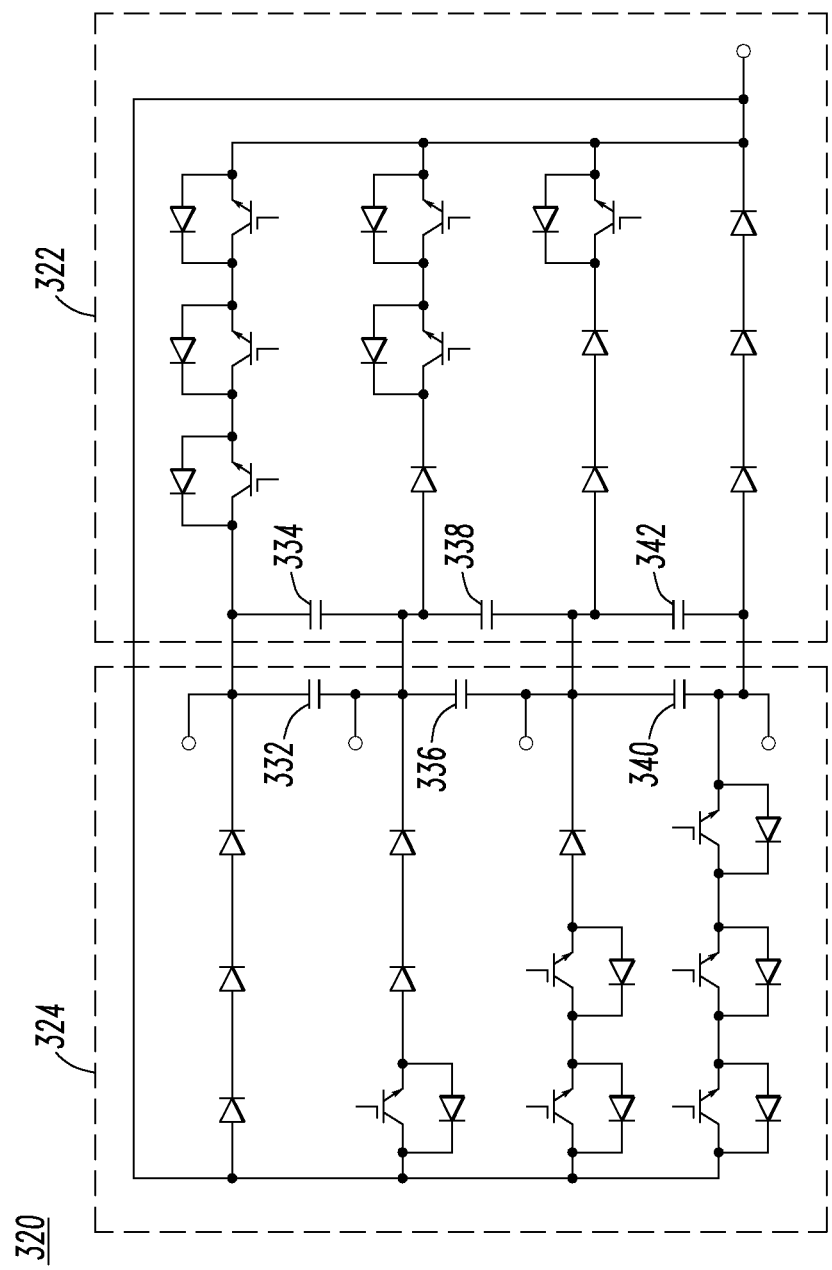
FIG. 14 is the electrical layout of the four-level NPP phase-leg of FIG. 13, but redrawn into a single plane after being split into half-legs in accordance with an embodiment of the disclosed concept.

FIG. 14 shows a redrawn mechanical arrangement 320 of the same four-level NPP topology 90 of FIG. 13. This is redrawn into a single plane after being split into half-legs 322, 324 in accordance with an embodiment of the disclosed concept. An important aspect of this mechanical arrangement 320 is that there are no nets that cross. The electronic circuit itself of FIG. 14 has the same electrical connections as the topology 90 of FIG. 13, but is believed to be mechanically novel and non-obvious. The capacitors 326, 328, 330 of FIG. 13 are split into two parallel capacitors 332-334, 336-338, 340-342, respectively, of FIG. 14.

Example 9

Figure 15A:
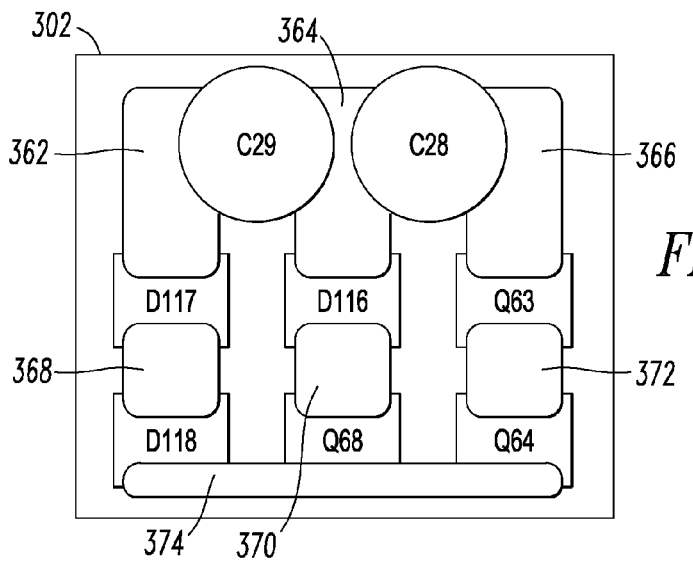
FIGS. 15A and 15B are plan views of a buswork electrical layout of the two half-legs of FIG. 12.
Figure 15B:
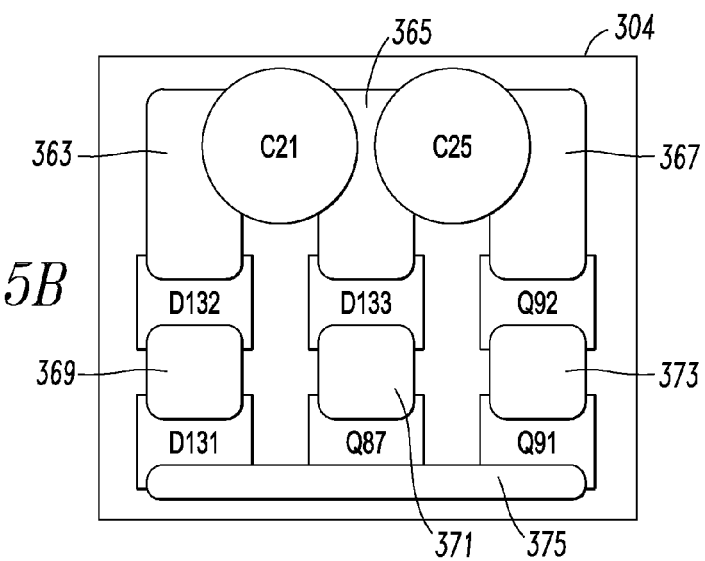
Figure 15C:
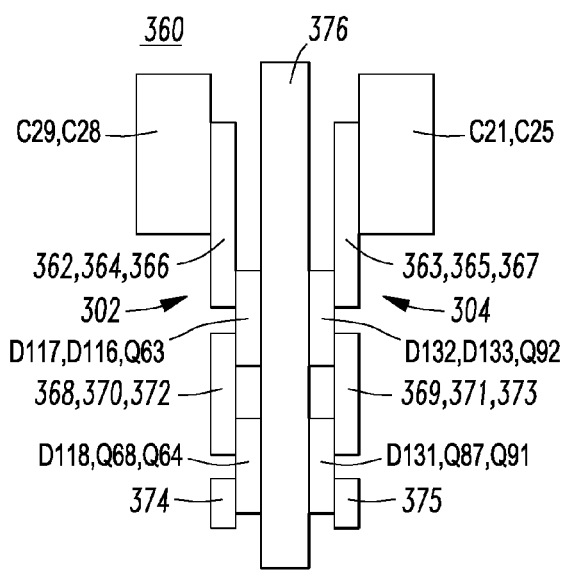
FIG. 15C is a vertical elevation view of the two assembled half-legs of FIGS. 15A and 15B.

FIGS. 15A-15C show another mechanical arrangement 360 of the same three-level NPP topology 80 of FIG. 11. For convenience of comparison, the same component reference designators for capacitors C29, C28, C21, C25, diodes D117, D118, D116, D132, D131, D133, and IGBTs Q68, Q63, Q64, Q87, Q92, Q91 are shown in the mechanical arrangement 300 of FIG. 12, it being understood that different mechanical structures (e.g., without limitation, a number of PCBs; buswork) can be employed. In FIGS. 15A-15C, the IGBT diodes D134, D135, D138, D152, D173, D174 are integrated with the IGBT package or are not employed. The various capacitors, diodes and IGBTs of the half-legs 302, 304 are electrically interconnected by individual sections 362, 364, 366, 368, 370, 372, 374 and 363, 365, 367, 369, 371, 373, 375 of buswork. Such sections can be made from a suitable conductor (e.g., without limitation, copper) having a suitable cross section for a relatively high current flow (e.g., as contrasted to PCB conductive traces). FIG. 15C show the two half-legs 302, 304 folded onto a number of cold plates 376. Alternatively, the number of cold plates 376 can employ an air channel (not shown) with a number of heat sink fins (not shown) and/or a number of insulators (not shown) in order to electrically insulate one of the half-legs 302, 304 from the other.

FIGS. 4-6, 9 and 10, 12, 14, and 15A-15C disclose various mechanical arrangements 110, 210, 300, 320, 360 of multilevel power converter circuits. For example, as shown in FIGS. 4-6, the power converter mechanical arrangement 110 includes a first portion 146 with a plurality of first control inputs 147, at least three direct current voltage inputs (e.g., without limitation, five DC voltage inputs 6, 8, 10, 12, 14 are shown in FIG. 3) and the alternating current voltage output 160, and a second portion 148 with a plurality of second control inputs 149, the at least three direct current voltage inputs (e.g., without limitation, five DC voltage inputs 6, 8, 10, 12, 14 are shown in FIG. 3) and the alternating current voltage output 160. The second portion 148 is split apart from the first portion 146. The power converter mechanical arrangement 110 has at least three levels (e.g., without limitation, five levels are shown in FIG. 3) corresponding to the at least three direct current voltage inputs (e.g., without limitation, five DC voltage inputs 6, 8, 10, 12, 14 are shown in FIG. 3).

The disclosed concept is directly applicable to inverters and motor drives of all power ranges.

The disclosed concept simplifies construction, including the use of, for example and without limitation, simple PCBs in the context of medium voltage converters. The disclosed mechanical arrangements may split the power converter at the AC connection point and unwrap the circuit into a first (e.g., without limitation, upper) section and a second (e.g., without limitation, lower) section. After this unwrap, the power converter may be constructed in a single layer or folded across an axis of DC link capacitors, thereby lending to a relatively very simple mechanical arrangement. All of the elements of the power converter are exposed to an even voltage distribution (e.g., without limitation, an even voltage from corner to corner of the example PCBs or buswork), which enables a very compact layout and allows relatively smaller clearances.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A mechanical arrangement of a multilevel power converter circuit for a single phase leg, comprising:
   a first inverter portion including (i) three or more direct current (DC) voltage input ports, and (ii) a first plurality of capacitors electrically coupled to the DC voltage input ports, and (iii) only one alternating current (AC) voltage output port, the first portion corresponding to a first half of the phase leg;
   a second inverter portion including (i) the three or more DC voltage input ports, and (ii) a second plurality of capacitors electrically coupled to the DC voltage input ports, and (iii) the one AC voltage output port, the second portion corresponding to the other half of the phase leg;
   wherein each capacitor of the first plurality of capacitors forms a parallel capacitor with a corresponding one of the capacitors of the second plurality of capacitors.

2. The mechanical arrangement of claim 1 wherein the power converter is a phase-leg of a motor drive.

3. The mechanical arrangement of claim 1 wherein the power converter is a phase-leg of a multilevel inverter selected from a group consisting of a diode-clamped multilevel inverter, a multilevel neutral point clamped inverter, a three-level neutral point clamped inverter, a four-level neutral point clamped inverter, a five-level neutral point clamped inverter, a multilevel neutral point piloted anti-parallel inverter, a multilevel neutral point piloted inverter, a three-level neutral point piloted inverter, a four-level neutral point piloted inverter, and a five-level neutral point piloted inverter.

4. The mechanical arrangement of claim 1 wherein the at least three levels is three levels.

5. The mechanical arrangement of claim 1 wherein the three or more levels is at least four levels.

6. The mechanical arrangement of claim 5 wherein the at least four levels is four levels.

7. The mechanical arrangement of claim 6 wherein the at least four levels is five levels.

8. The mechanical arrangement of claim 1 wherein the first portion is on a first printed circuit board; and wherein the second portion is on a second printed circuit board separated from the first printed circuit board by an insulator.

9. The mechanical arrangement of claim 8 wherein the power converter circuit is structured to output a medium voltage.

10. The mechanical arrangement of claim 8 wherein the first printed circuit board is parallel to the second printed circuit board.

11. The mechanical arrangement of claim 8 wherein the first printed circuit board is above the second printed circuit board.

12. The mechanical arrangement of claim 8 wherein the first printed circuit board includes a first plurality of layers; and wherein the second printed circuit board includes a second plurality of layers.

13. The mechanical arrangement of claim 12 wherein the first plurality of layers and the second plurality of layers are two layers.

14. The mechanical arrangement of claim 1 wherein the first portion is electrically interconnected by a first buswork; and wherein the second portion is electrically interconnected by a second buswork separated from the first buswork by at least one insulator.

15. The mechanical arrangement of claim 1 wherein the first portion is on a first layer of a printed circuit board; and wherein the second portion, separated from first the layer by an insulator, is on a second layer of the printed circuit board.

16. The mechanical arrangement of claim 1 wherein the first portion is on a first area of a printed circuit board; and wherein the second portion is on a second area of the printed circuit board, the first said portion separated from the second said portion by a gap.

17. The mechanical arrangement of claim 16 wherein the power converter circuit is structured to output a low voltage.

18. The mechanical arrangement of claim 17 wherein the first area of the printed circuit board includes at least one layer; and wherein the second area of the printed circuit board includes at least one layer.

* * * * *